(No Model.) 2 Sheets—Sheet 1.

E. M. LOW.
BALL AND SOCKET JOINT CLAMPING DEVICE.

No. 490,150. Patented Jan. 17, 1893.

Witnesses
Chas. F. James
John J. Powers.

Inventor
Everett M. Low,
By his Attorney
John C. Dewey (No Model.) 2 Sheets—Sheet 2.
E. M. LOW.
BALL AND SOCKET JOINT CLAMPING DEVICE.

No. 490,150. Patented Jan. 17, 1893.

Witnesses
Chas. F. Schulz
John J. Powers.

Inventor
Everett M. Low,
By his Attorney
John C. Dewey

UNITED STATES PATENT OFFICE.

EVERETT M. LOW, OF WORCESTER, MASSACHUSETTS.

BALL-AND-SOCKET-JOINT CLAMPING DEVICE.

SPECIFICATION forming part of Letters Patent No. 490,150, dated January 17, 1893.

Application filed March 16, 1892. Serial No. 425,166. (No model.)

*To all whom it may concern:*

Be it known that I, EVERETT M. LOW, a citizen of the United States, residing at Worcester, in the county of Worcester and State of Massachusetts, have invented certain new and useful Improvements in Ball-and-Socket-Joint Clamping Devices; and I do hereby declare that the following is a full, clear, and exact description thereof, which, in connection with the drawings making a part of this specification, will enable others skilled in the art to which my invention belongs to make and use the same.

My invention relates to clamping devices, and more particularly to a clamping device having a ball and socket joint, by means of which the rod, or other article to be clamped, may be moved longitudinally or otherwise, and held at almost any desired angle, relatively to the article to which the clamping device is secured; and the object of my invention is to provide a simple and effective clamping device, provided with a ball and socket joint, in which the rod, or other article to be clamped will be supported, and held upon the exterior surface of the ball.

My invention consists in certain novel features of construction and operation of my improved ball and socket joint clamping device, as will be hereinafter fully described, and the nature thereof indicated by the claims.

Figure 1:
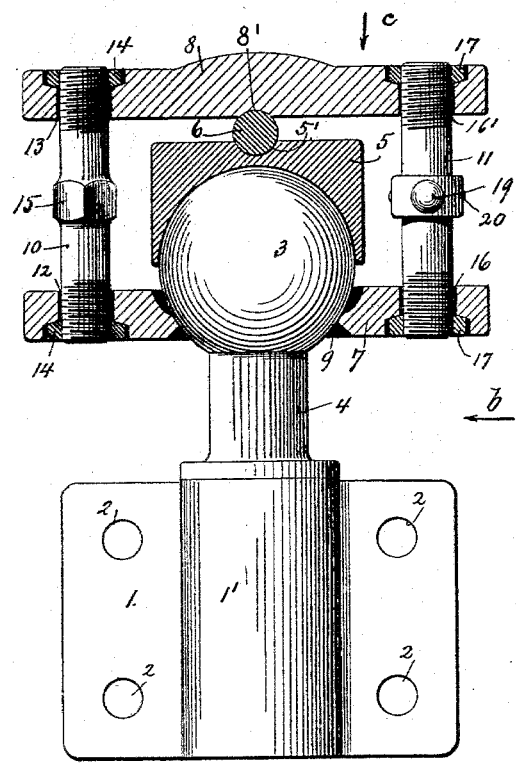
Figure 2:
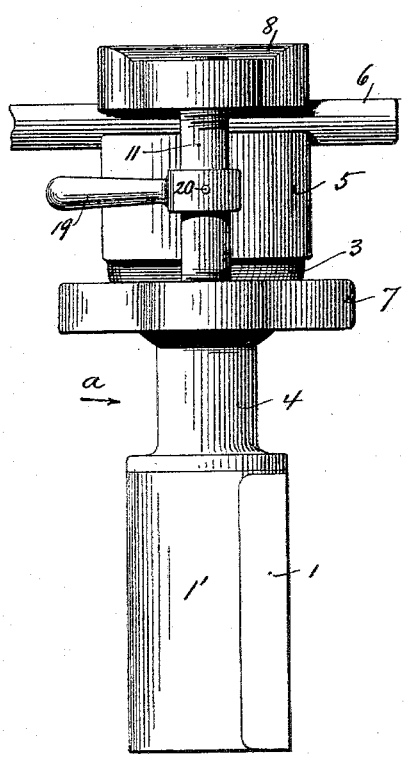
Figure 3:
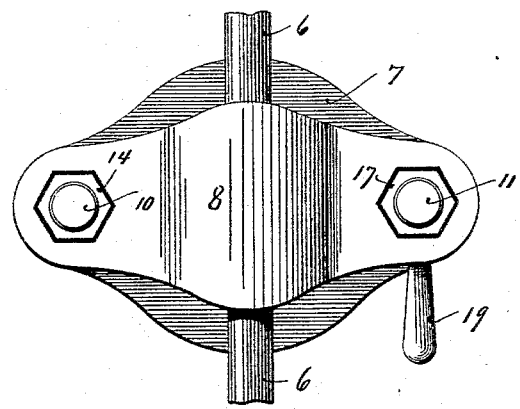
Figure 4:
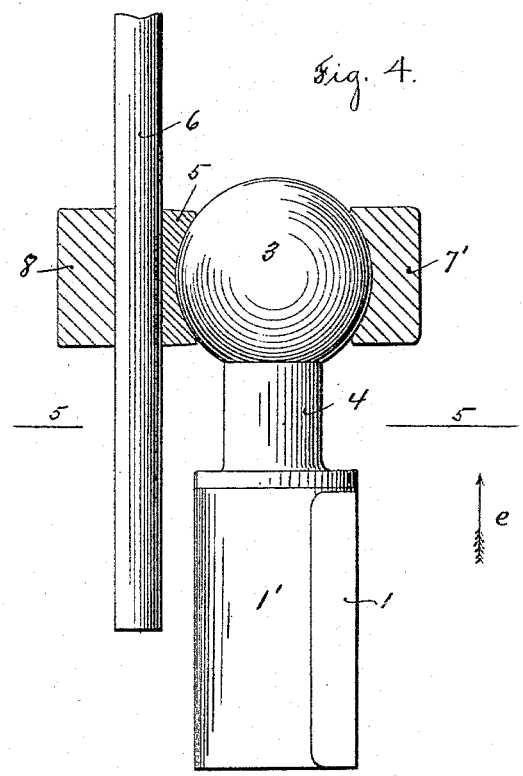
Figure 5:
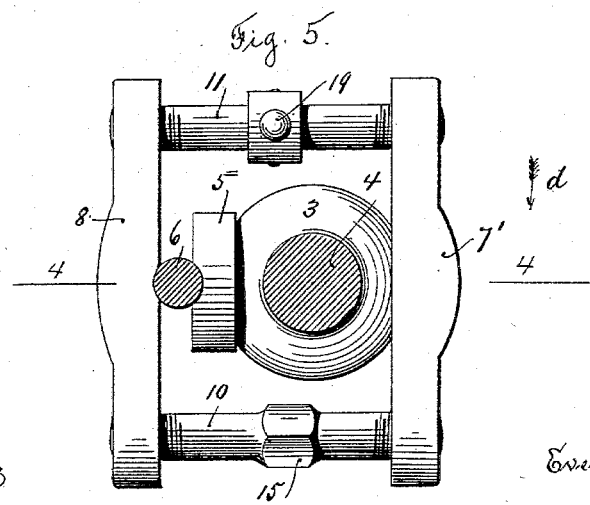

Referring to the drawings:—Figure 1 is a central vertical section of my improved clamping device, and a rod clamped therein, looking in the direction of arrow $a$, Fig. 2. Fig. 2 is an edge view, looking in the direction of arrow $b$, Fig. 1. Fig. 3 is a plan view, looking in the direction of arrow $c$, Fig. 1. Fig. 4 is a central vertical section, taken on line 4, 4, Fig. 5, looking in the direction of arrow $d$, same figure, showing a modified construction of my clamping device, and Fig. 5 is a cross section, taken on line 5, 5, Fig. 4, looking in the direction of arrow $e$, same figure.

In the accompanying drawings, 1 is a plate, preferably provided with holes 2, for the reception of screws, bolts, or rivets to secure the plate in position.

3 is a ball, which forms one member of the ball and socket joint, and is provided with a shank 4, preferably made integral therewith, which is secured at its lower end in the enlarged portion 1′ of the plate 1.

5 is the cap or socket piece, which extends over and is supported upon the upper part of the ball 3. The socket piece 5 is preferably provided with a groove or depression 5′ in the upper surface thereof to receive the rod 6, which may be moved longitudinally in said groove, and may also be moved with the socket piece 5, on the ball 3.

The clamping device proper, for clamping the socket piece 5, and the rod 6 supported thereon, at any desired angle on the ball 3, consists of the lower plate 7, forming in connection with the socket piece 5, the other member of the ball and socket joint, and the upper clamping plate 8. The lower plate 7 is provided with a circular opening 9 therein, to receive the ball 3. The shank 4 of the ball 3 is inserted through the opening 9, from the upper side of the plate 7, before the clamping plate 8 is attached thereto. The upper and lower edges of the opening 9, in the plate 7, are preferably cut away, or beveled, as shown in Fig. 1, so that only the central portion of the opening will bear against the surface of the ball 3, thus allowing a greater range of movement of the plate 7 on the ball 3. The upper clamping plate 8 extends in a plane over the top of the ball 3, and is substantially parallel with the plate 7, and the clamping plate 8 is preferably provided with a groove or depression 8′ in the lower surface to receive the rod 6, and is connected or hinged at one end to the plate 7, in this instance by means of a screw 10. The ends of the screw 10 extend loosely through holes 12 and 13 in the plate 7 and 8 respectively, so as to allow a slight rocking motion of the plates 7 and 8 on the screw 10. The respective ends of the screw 10 are provided with right and left hand screw threads, and have nuts 14 thereon, which are held in the enlarged outer ends of the openings 12 and 13, see Figs. 1 and 3. The screw 10 is preferably provided with the wrench section 15, to turn the screw and adjust the position of the plates 7 and 8, according to the size of the rod 6 to be clamped. The screw 11, which in this instance forms the clamping screw for drawing the plates 7 and 8 together, to clamp the rod 6 and the clamping device on the ball 3, has a right and left hand screw thread at each end thereof respectively, and the ends of said screw 11 extend loosely through holes 16 and 16' in the plates 7 and 8 respectively, and have nuts 17 thereon, held in the outer enlarged ends of the openings 16 and 16'. The screw 11 is preferably provided with a handle 19 secured thereto by a rivet 20, or otherwise, for turning said screw 11, to cause the clamping plate 8 to approach the plate 7 at that end.

From the above description, in connection with the drawings, the operation of my improved ball and socket joint clamping device, will be readily understood by those skilled in the art. The plate 7 is first combined with the ball 3 by inserting the ball into the opening 9 therein, from the upper side of said plate, and the socket piece 5 is then placed upon the ball, and the clamping plate 8 is secured to the plate 7 by means of the screws 10 and 11, and the nuts 14 and 17, as above described. The shank or support 4, of the ball 3 is then rigidly secured in the plate 1, or otherwise.

It will be seen, that the clamping device proper, consisting of the plates 7 and 8, and screws 10 and 11, and the socket piece 5, cannot be removed or detached from the ball 3, after having been put together as above described, but is free to be moved thereon into almost any desired position, by reason of the ball and socket joint construction. The rod 6 to be clamped, is inserted between the clamping plate 8 and the socket piece 5, and extends in the depression 5' in the socket piece 5, and also in the depression 8' in the clamping plate 8; the screw 11 having been first turned to raise the clamping plate 8, and allow the free insertion of the rod 6. After the rod 6 has been inserted between the clamping plate 8 and the socket piece 5, the entire clamping device with the rod 6 is moved around on the ball 3 to any desired position, and then the screw 11 is turned by the handle 19, or otherwise, causing the clamping plate 8 to be drawn toward the plate 7, and thus clamp the rod 6 between the plate 8 and the socket piece 5, and at the same time clamp the ball 3 between the socket piece 5 and the plate 7, as will be readily understood by those skilled in the art.

I have shown in Figs. 4 and 5 a modified construction of the clamping device, in which the rod to be clamped is arranged parallel to the support of the ball, instead of at right angles thereto, as shown in Figs. 1, 2, and 3. The lower plate 7' in Figs. 4 and 5, is made solid instead of having a circular opening 9 therein, as shown in Fig. 1, for the reason that the shank or support 4, for the ball 3, does not extend through said plate. The plate 7' is provided with a central depressed portion having a concave surface to receive the convex surface of the ball 3, as shown in Fig. 4. The socket piece 5, in Figs. 4 and 5, is made smaller than the socket piece 5, in Figs. 1, 2, and 3, to prevent the socket piece from striking against the shank 4, when the clamping device is moved thereon.

The construction and operation of the modification shown in Figs. 4 and 5, with the exception of the construction of the plate 7', are the same as the construction and operation of the clamping device shown in Figs. 1, 2, and 3.

The advantages of my improved ball and socket joint clamping device, will be readily appreciated by those skilled in the art.

It will be seen, that the rod, or other article to be clamped, is clamped upon the exterior surface of the ball, and therefore said ball may be made in one piece. The width of the socket piece 5, and of the clamping plate 8 afford a considerable bearing surface, as shown in Fig. 2, to clamp the rod 6.

It will be understood, that the details of construction of the parts of my clamping device may be varied from what is shown and described, if desired.

Having thus described my invention, what I claim as new, and desire to secure by Letters Patent is:—

1. In a clamping device, the combination with the ball, and the socket piece supported on the ball, of means for clamping the socket piece upon the ball, and the rod upon the socket piece, substantially as set forth.

2. The combination with the ball, and the socket piece, supported and adapted to be clamped thereon, of means for clamping the socket piece on the ball, and the rod on the socket piece, consisting of two plates extending upon opposite sides of the ball, and means for drawing said plates together, substantially as set forth.

3. The combination with the ball, and a socket piece supported and adapted to be clamped on the ball, and a clamping device: consisting of two plates extending upon opposite sides of the ball, one of said plates having a circular opening therein to hold the ball, and the other plate connected with said plate at one end, and means for drawing the plates together at their other ends, for the purpose stated, substantially as set forth.

4. The combination with the ball, and a socket piece supported and adapted to be clamped thereon, and means for clamping the socket piece upon the ball and for clamping the rod on the socket piece: consisting of two plates extending upon opposite sides of the ball, and means for connecting said plates, and moving them toward each other, for the purpose stated, substantially as set forth.

EVERETT M. LOW.

Witnesses:
JOHN C. DEWEY,
JOHN J. POWERS.